United States Patent [19]

Helbling

[11] Patent Number: 5,555,497
[45] Date of Patent: * Sep. 10, 1996

[54] CHARITABLE CONTRIBUTION CENTRALIZATION SYSTEM AND APPARATUS

[76] Inventor: Edward Helbling, 47 Annandale Rd., Commack, N.Y. 11725

[*] Notice: The portion of the term of this patent subsequent to Mar. 21, 2014, has been disclaimed.

[21] Appl. No.: 234,409

[22] Filed: Apr. 28, 1994

Related U.S. Application Data

[63] Continuation-in-part of Ser. No. 215,372, Mar. 21, 1994.

[51] Int. Cl.⁶ .............................. G06F 17/60; G06F 7/04; B42D 15/00; G06G 7/52
[52] U.S. Cl. .................... 364/401; 395/375; 221/151; 235/375; 235/381; 340/541; 340/825.35; 194/205; 194/209; 194/350; 283/70
[58] Field of Search ................................ 364/401, 405, 364/406; 235/375, 380, 92 GA, 381; 340/541, 825.35; 194/350, 209, 205; 283/70; 221/151, 81; 273/138; 395/375

[56] References Cited

U.S. PATENT DOCUMENTS

| | | | |
|---|---|---|---|
| 3,852,576 | 12/1974 | Rudd | 235/92 GA |
| 4,157,829 | 6/1979 | Goldman et al. | 273/138 |
| 4,319,336 | 3/1982 | Anderson et al. | 395/375 |
| 4,809,837 | 3/1989 | Hayashi | 194/205 |
| 4,973,952 | 3/1993 | Malec et al. | 340/825.358 |
| 5,013,896 | 5/1991 | Ono et al. | 235/381 |
| 5,091,713 | 2/1992 | Horn et al. | 340/541 |
| 5,150,817 | 9/1992 | Livingston | 221/81 |
| 5,190,133 | 3/1993 | Bolen | 194/350 |
| 5,226,519 | 7/1993 | DeWoolfson | 194/209 |
| 5,243,174 | 9/1993 | Veeneman et al. | 235/381 |
| 5,283,829 | 2/1994 | Anderson | 380/29 |
| 5,308,120 | 5/1995 | Thompson | 283/70 |
| 5,339,985 | 8/1994 | Perez | 221/151 |
| 5,353,218 | 10/1994 | De Lapa et al. | 364/401 |

OTHER PUBLICATIONS

"Charitable ATM menu option", ABA Banking Journal vol. 85 issue N.4, p. 58 (1) Apr. 1993.
"Charity through the bank" EFT Report v. 17 issue n23 p. 5 (2) Nov. 9, 1994.
"Donating to Charity now Automated" Oakland Press Pontiac Mich Jan. 21, 1994.

*Primary Examiner*—Gail O. Hayes
*Assistant Examiner*—Felicia Ives
*Attorney, Agent, or Firm*—Herbert Dubno

[57] ABSTRACT

A multiplicity of charitable collection stations are provided with selectors for choosing the charity to which a contribution is destined, a change maker for issuing change if desired, a display for displaying information with respect to premiums available and contributions made, and a modem or other telecommunicator for two-way communications with a central station. The central station communicates with the individual charitable institutions to provide information as to monies collected and signals the machines as to premiums available like food-service items, travel awards and the like.

3 Claims, 1 Drawing Sheet

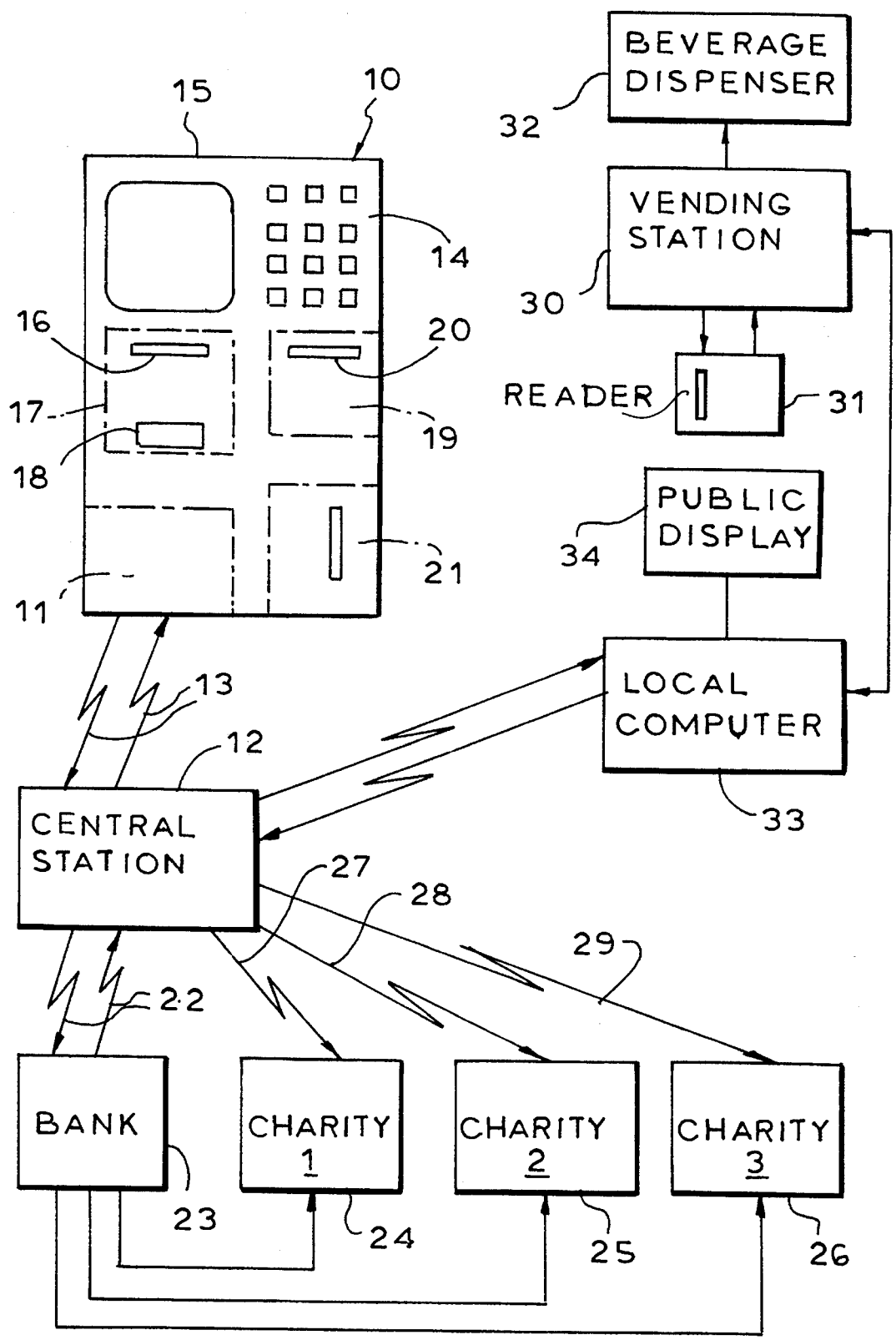

5,555,497

CHARITABLE CONTRIBUTION CENTRALIZATION SYSTEM AND APPARATUS

CROSS REFERENCE TO RELATED APPLICATION

This application is a continuation-in-part of my copending U.S. patent application Ser. No. 08/215,372 filed 21 Mar. 1994.

FIELD OF THE INVENTION

The present invention relates to a charitable contribution centralization system and method, equipment for practicing the method and a method of operating the equipment.

BACKGROUND OF THE INVENTION

The wide-spread desire, especially of the consuming, public, to make charitable contributions, the large number of charitable institutions which can benefit from such contributions and have wide-spread public appeal, and the number of vending facilities which have developed utilizing in part premiums, contests, discounted meals or portions thereof, and the like, generally has not heretofore resulted in a correlation capable of facilitating such contributions, promoting the vendors, or facilitating transfer to charities of large numbers of small sums from the purchasing public.

In my application, I mention the possibility of a centralized accounting and collection system for charitable contributions made at respective vending establishments and capable of communicating to a number of charitable institutions which may subscribe to the central station installation, results of such collections so as to enable the charitable institutions to receive payments directly from the central station or from the vending establishments based on an accounting provided by the central station.

OBJECTS OF THE INVENTION

It is the principal object of the present invention to extend the principles of the earlier application insofar as centralized charitable collection and accounting is concerned.

Another object is the provision of such an improved method of and apparatus for centralizing charitable collections and distributions and promoting both the contribution to charities and selected vendors in an efficient manner.

SUMMARY OF THE INVENTION

I have found that contributions to charitable institutions can be greatly enhanced if those charitable contributions are tied to promotional activities of vendors desiring to supply products to the respective donors and thereby have their products promoted and/or the vendor associated with charitable work in the minds of potential contributors.

According to the invention, at selected locations, machines for collecting charitable contributions are provided which are tied to a central collecting and accounting station, each of the machines having a screen for displaying a selected group of charities and, if desired, collections to date at that machine and/or collections to date at all of the machines in a given locality and/or all of the machines throughout the nation, depending upon whether a campaign is local, regional or national.

The machine will be provided by means for insertion of monies and retaining the monies and/or of providing change, and means for issuing an information carrier which can serve as a receipt for the monies contributed and, in addition, can entitle the bearer to some premium. For example, the premium may be food service in a food service establishment, a gift of a newspaper or other item of goods in a goods vending establishment, or even a chance on a large gift to be awarded in a selection process, such as a trip within the United States or abroad, an automotive vehicle, or a dinner at a restaurant or the like.

The premiums generally will be offered upon solicitation from the central station and, for example, an airline, travel agency or resort may offer a particular charity or group of charities, a vacation for a certain period of time, a restaurant may contribute meal services or free meals or a food vending establishment may offer a significant number of free beverages, hamburgers or full meals for redemption upon presence of the appropriate slip.

Preferably the machines and the central station are provided for communication with one another with appropriate modems or the like, e.g. for telecommunications by telephone wires or for wireless communication, e.g. by radio waves.

In turn, the central station may have facilities for telecommunication or wireless transmission with the offices of the respective charities and/or a bank servicing the charities so as to be capable of delivering by wire transfer funds collected by the central station.

If desired, the information carrier may be read by a reader at the vending station for dispensing of a beverage or for authentication of the information carrier and the central station may communicate with the computerized facilities of the cooperating service stations so that the centralized station is aware as to the extent to which the information carriers have been redeemed.

The machines can be provided in the respective service areas directly or at other locations if desired and will therefore induce use of the service establishment at which the information carrier can be redeemed.

The machine may also have a reader capable of reading a credit card so that at the central station the credit card account of the contributor can be debited or charged.

More particularly, a method of coordinating charitable-contribution operations according to the invention can comprise:

(a) collecting respective charitable contributions at a number of charitable-collection stations provided with
   means for receiving a charitable contribution,
   means for registering a charitable contribution received, and
   means for issuing an information carrier serving as a receipt for a charitable contribution made and a right to a premium incident upon receipt of a charitable contribution,
and issuing a respective the information carrier from each charitable-collection station for a charitable contribution made;

(b) transmitting from each of the charitable-collection stations to a central accounting and control station information as to charitable contributions made at the stations and charitable institutions to which contributions are destined;

(c) notifying from the central station individual charitable institutions of contributions due based upon collections at the charitable-collection stations; and (d) issuing to respective donors, based upon the information carriers selected premiums.

The system itself can comprise:

a plurality of charitable-collection machines each provided with means for receiving a charitable contribution, means for registering a charitable contribution received, means for issuing an information carrier serving as a receipt for a charitable contribution made and a right to a premium incident upon receipt of a charitable contribution, and means for bidirectional remote communication of information generated in the machine and information controlling the machine;

a central station communicating with the machines through respective means for bidirectional remote communication of information, the central station including a computer for registering charitable contributions made at the machines, and with means for communicating information as to charitable contributions made with individual charitable institutions; and means responsive to information on the information carriers for issuing a food-service article in response to information carried by the information carrier.

BRIEF DESCRIPTION OF THE DRAWING

The above and other objects, features, and advantages will become more readily apparent from the following description, reference being made to the accompanying sole FIGURE.

SPECIFIC DESCRIPTION

In the drawing, I have shown at 10 one of a large number of machines which may be remotely located and all of which can have modems or like means for telecommunications with a central station 12 as represented by the arrows 13.

The machine 10 has a keyboard 14 or other set of selectors enabling a particular charity to be selected from, say, a number of charities displayed on a monitor 15 controlled from the central station 12. In addition, the amount of money to be contributed can be selected via the keyboard 14, generally in increments of a specific sum, say $1.00. The dollar is inserted into a slot 16 of a conventional currency recognition unit 17 capable of returning the currency if it is not authentic or providing change which is delivered at the outlet 18.

Collected sums may be removed from the strong box (not shown) of the machine from time to time and the machine may have an internal counter for registering the funds collected.

The funds collected are also transmitted to the central station as a verification of the honesty of the collector.

The machine 10 also comprises a printer, bar code applicator, mechanical strip applicator or other information carrier issuing unit 19 having a slot 20 from which an information carrier can be used.

The information carrier can be a slip of paper, a token, a card bearing a magnetic strip, a bar code or other electrically, optically or magnetically sensed information capable of being read in a reader. The card may be imprinted with a logo of the particular charity to which the contribution was made and the amount of the contribution to serve as a receipt and can contain any words of acknowledgement and thanks that may be appropriate.

The machine 10 can also comprise a card reader 21 capable of reading a credit card or debit cad and, through the central station 12, either debiting the account of the donor or issuing a charge through the charge card service to the donor.

As will be apparent, the central station maintains an instantaneously and continuously updated register as to the sums collected by each machine and all machines, the sums charged to various credit card accounts by each machine and the sums due to the respective charities. At selected intervals, the sums due to the respective charities may be transferred by the central station, preferably as a wire transfer or the like, either through the telecommunication or wireless lines represented at 22 to a bank 23 service a number of charities 24, 25 and 26, or by directing communication via lines 27, 28 and 29 with these charities.

All modes of wire or wireless communication can be used, namely, radiowaves, microwaves, telephone lines, dedicated lines and the like.

The donor, carrying the information carrier, can visit a vendor which has offered a premium also displayed on the monitor 50 and as is represented by a vending station 30. A reader 31 at the reading station can read, cancel and return the information carrier and based thereon a beverage dispenser 32 can be operated, for example, to dispense a beverage as representative of any premium which may be provided.

A local computer 33 connected to the vending station may generate a public display 34 in the restaurant or other food service establishment which can reflect the charitable campaign which may be underway or the accounts contributed by the patrons redeeming their information carrier, etc.. The central station generally will endeavor to collect from possible vendors, public spirited sources of services, premiums and/or rewards to be associated with the charitable campaign and to be provided in response to the information carrier or for which the information carrier can be a chance to win a particular prize. In that case, rather than redeeming the information carrier for a beverage or like food item, the donor can retain the information carrier until notified of a reward based upon some selection process as in games of chance.

I claim:

1. A method of coordinating charitable contribution operations, comprising the steps of:

(a) collecting respective charitable contributions at a number of charitable-collection stations provided with means for receiving a charitable contribution, means for registering said charitable contribution received, and means for issuing an information carrier serving as a receipt for said charitable contribution made and indicia of a specific premium upon receipt of said charitable contribution, and issuing a respective said information carrier with said indicia thereon from each charitable-collection station for said charitable contribution made;

(b) transmitting from each of said charitable-collection stations to a central accounting and control station information as to charitable contributions made at said stations and charitable institutions to which said charitable contributions are destined;

(c) displaying at each of said charitable-collection stations a premium to which a contributor may be entitled by virtue of said charitable contribution made;

(d) notifying from said central station individual charitable institutions of said charitable contributions due based upon said charitable contributions at said charitable-collection stations; and (e) issuing to respective contributors, based upon said information carriers and upon presentation thereof selected premiums, said premiums being food service items issued to said donors upon reading of said information carriers at respective vending machines.

2. A method of coordinating charitable contribution operations, comprising the steps of:

(a) collecting respective charitable contributions at a number of charitable-collection stations provided with means for receiving a charitable contribution,
means for registering said charitable contribution received, and
means for issuing an information carrier serving as a receipt for said charitable contribution made indicia of a specific premium upon receipt of said charitable contribution,
and issuing a respective said information carrier with said indicia thereon from each charitable-collection station for said charitable contribution made;

(b) transmitting from each of said charitable-collection stations to a central accounting and control station information as to charitable contributions made at said stations and charitable institutions to which said charitable contributions are destined;

(c) displaying at each of said charitable-collection stations a premium to which a contributor may be entitled by virtue of said charitable contribution made;

(d) notifying from said central station individual charitable institutions of said charitable contributions due based upon said charitable contributions at said charitable-collection stations; and (e) issuing to respective contributors, based upon said information carriers and upon presentation thereof selected premiums, said method further comprising the step of receiving currency for a charitable contribution at each of said charitable-collection stations and issuing change upon said currency exceeding a predetermined currency level.

3. A method of coordinating charitable contribution operations, comprising the steps of:

(a) collecting respective charitable contributions at a number of charitable-collection stations provided with means for receiving a charitable contribution,
means for registering said charitable contribution received, and
means for issuing an information carrier serving as a receipt for said charitable contribution made indicia of a specific premium upon receipt of said charitable contribution,
and issuing a respective said information carrier with said indicia thereon from each charitable-collection station for said charitable contribution made;

(b) transmitting from each of said charitable-collection stations to a central accounting and control station information as to charitable contributions made at said stations and charitable institutions to which said charitable contributions are destined;

(c) displaying at each of said charitable-collection stations a premium to which a contributor pay be entitled by virtue of said charitable contribution made;

(d) notifying from said central station individual charitable institutions of said charitable contributions due based upon said charitable contributions at said charitable-collection stations; and (e) issuing to respective contributors, based upon said information carriers and upon presentation thereof selected premiums, said method further comprising the step of automatically reading said information carrier at at least one vending station at which said information carriers are redeemed for premiums.

* * * * *